(12) United States Patent
Chiang et al.

(10) Patent No.: US 8,442,453 B2
(45) Date of Patent: May 14, 2013

(54) RADIO COMMUNICATION TRANSCEIVER

(75) Inventors: Ming Chou Chiang, Shinchu (TW); Hsin Chieh Huang, Shinchu (TW)

(73) Assignee: ISSC Technologies Corp., Shinchu (TW)

( * ) Notice: Subject to any disclaimer, the term of this patent is extended or adjusted under 35 U.S.C. 154(b) by 311 days.

(21) Appl. No.: 12/913,541

(22) Filed: Oct. 27, 2010

(65) Prior Publication Data
US 2011/0281527 A1 Nov. 17, 2011

(30) Foreign Application Priority Data
May 14, 2010 (TW) ................................ 99115545 A

(51) Int. Cl.
*H04B 1/44* (2006.01)
(52) U.S. Cl.
USPC ............................................. 455/78; 455/83
(58) Field of Classification Search .................. 455/341, 455/338, 323, 73, 292, 279.1, 78, 83, 199.1; 330/276, 277
See application file for complete search history.

(56) References Cited

U.S. PATENT DOCUMENTS
2004/0253939 A1 12/2004 Castaneda et al.
2007/0152904 A1 7/2007 Castaneda et al.

OTHER PUBLICATIONS

Haitao Gan, et al., Integrated Transformer Baluns for RF Low Noise and Power Amplifiers, Radio Frequency Integrated Circuit (RFIC) Symposium, Jun. 11-13, 2006, Fan Francisco, CA.
B. Marholev, et al., A Single-Chip Bluetooth EDR Device in 0.13um CMOS, IEEE International Solid-State Circuits Conference, 2007, Session 31, 31.1.

*Primary Examiner* — Eugene Yun
(74) *Attorney, Agent, or Firm* — Morris Manning & Martin LLP; Tim Tingkang Xia, Esq.

(57) ABSTRACT

A radio communication transceiver achieving impedance matching when the transceiver operates in an output state and an input state respectively in a manner of switching a switch includes a transformer, a switch, a power amplifier (PA), and a low noise amplifier (LNA). The transformer has a primary winding including a first endpoint and a second endpoint and a secondary winding including a first endpoint and a second endpoint. The switch has a gate, a drain, and a source, wherein the gate receives a control signal, the drain is connected to the second endpoint of the primary winding, and the source is connected to the second endpoint of the secondary winding. The PA has an output terminal connected to the first endpoint of the primary winding of the transformer. The LNA has an input terminal connected to the second endpoint of the primary winding of the transformer.

10 Claims, 3 Drawing Sheets

RADIO COMMUNICATION TRANSCEIVER

CROSS-REFERENCE TO RELATED APPLICATIONS

This non-provisional application claims priority under 35 U.S.C. §119(a) on Patent Application No(s). 099115545 filed in Taiwan, R.O.C. on May 14, 2010, the entire contents of which are hereby incorporated by reference.

BACKGROUND OF THE INVENTION

1. Field of Invention

The present invention relates to a radio communication transceiver, and more particularly to an impedance matching circuit used for the radio communication transceiver.

2. Related Art

When a radio communication transceiver is applied, impedance matching between the transceiver and an antenna needs to be taken into consideration. In the radio communication transceiver of the prior art, a used amplifier is in a dual-end transmitting manner, which relatively increases energy consumption, and also increases cost consumption.

For example, in the US Application with the public No. 2007/0152904 A1 and entitled "IMPEDANCE MATCHED PASSIVE RADIO FREQUENCY TRANSMIT/RECEIVE SWITCH", ratio turns in a selected balun transformer is utilized, and is used together with a primary winding connected to an antenna and with a power amplifier (PA) and a low noise amplifier (LNA) in dual-end transmitting connected to a secondary winding, which results in the impedance matching for the antenna at the time of outputting and inputting respectively.

Further for example, in the US Application with the public No. US 2004/0253939A1 and entitled "INTEGRATED CIRCUIT RADIO FRONT-END ARCHITECTURE AND APPLICATIONS THEREOF", a multi-tap balun transformer consisting of a primary winding and a symmetrical multi-tap secondary winding is utilized, and an input impedance matching circuit is added between the primary winding and an antenna, a PA and an LNA in dual-end transmitting of which are connected to a first pair and a second pair of the symmetrical multi-tap secondary winding respectively. By switching a mode of the multi-tap balun transformer, impedance matching for the antenna at the time of outputting and inputting is achieved respectively.

However, both of the foregoing applications are used together with the amplifiers in the dual-end transmitting manner, which relatively increases energy and loss consumption. Hence, it is expected to invent a radio communication transceiver capable of being used together with an amplifier in single end transmitting manner, reducing energy consumption, and achieving impedance matching simultaneously without any additional elements, thus decreasing the cost.

SUMMARY OF THE INVENTION

Accordingly, the present invention is a radio communication transceiver, so as to achieve impedance matching when the transceiver outputs and inputs a signal respectively in a manner of switching a switch. The radio communication transceiver comprises: a transformer, a switch, a PA, and an LNA. The transformer has a primary winding and a secondary winding, the primary winding has a first endpoint and a second endpoint, and the secondary winding has a first endpoint and a second endpoint. The switch has a gate, a drain, and a source, in which the gate receives a control signal (CS), the drain is connected to the second endpoint of the primary winding of the transformer, and the source is connected to the second endpoint of the secondary winding of the transformer. The PA has an output terminal connected to the first endpoint of the primary winding of the transformer. The LNA has an input terminal connected to the second endpoint of the primary winding of the transformer. The switch enables the radio communication transceiver to receive a signal through an antenna and transmit the signal to the LNA corresponding to a first potential of the CS, and enables the signal to be emitted by the antenna through the PA corresponding to a second potential of the CS.

In the following embodiments, how to utilize OFF and ON state of the switch to achieve impedance matching is described respectively for both a receiving state and an emitting state of the radio communication transceiver.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Hereinafter, describing preferable embodiments in detail aims at illustrating the present invention, while does not limit detailed description of the present invention.

Figure 1:
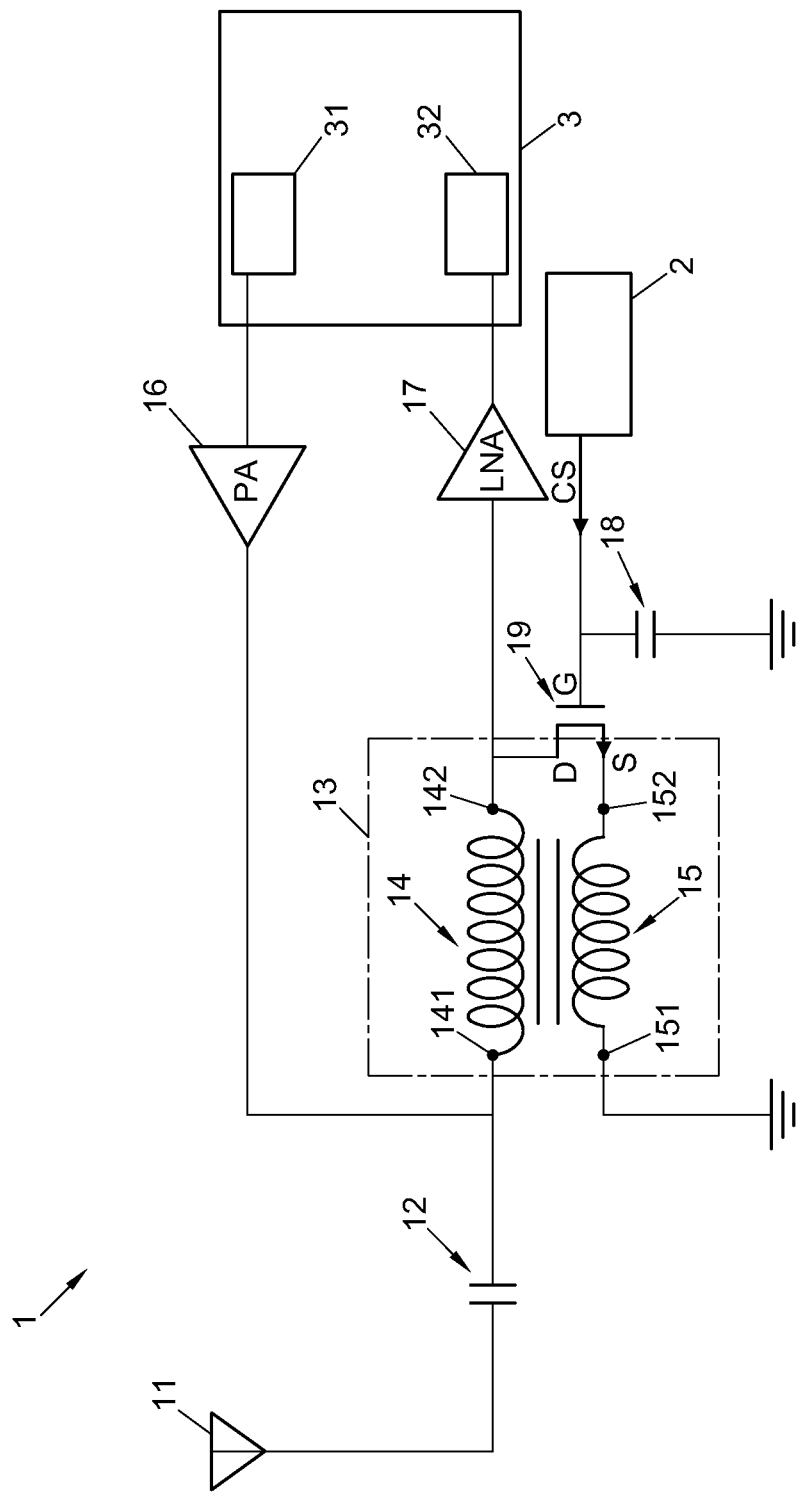
FIG. 1 is a schematic view of a radio communication transceiver 1 according to an example of the present invention.

FIG. 1 shows an embodiment of a radio communication transceiver 1 according to the present invention. Referring to FIG. 1, this radio communication transceiver 1 comprises a transformer 13, a power amplifier (PA) 16, a low noise amplifier (LNA) 17, and a switch 19.

The transformer 13 comprises a primary winding 14 and a secondary winding 15. The primary winding 14 has a first endpoint 141 and a second endpoint 142. The secondary winding 15 has a first endpoint 151 and a second endpoint 152.

The switch 19 can be turned ON or OFF corresponding to a control signal (CS) from a host 2. In this embodiment, the switch 19 can be a transistor, such as a Metal-Oxide-Semiconductor Field-Effect Transistor (MOS), comprising a gate (labeled as "G"), a drain (labeled as "D"), and a source (labeled as "S").

The PA 16 has an input terminal and an output terminal. The input terminal is connected to an internal circuit 3 of the transceiver 1, for example, connected to an up-conversion module 31. The output terminal is connected to the first endpoint 141 of the primary winding 14 of the transformer 13, and is connected to an antenna 11 through a coupling capacitor 12.

The LNA 17 has an output terminal and an input terminal. The output terminal is connected to the internal circuit 3 of the transceiver 1, for example, connected to a down-conversion module 32. The input terminal is connected to both the second endpoint 142 of the primary winding 14 of the transformer 13 and the drain of the switch 19.

The gate of the switch 19 is connected to the host 2 and is grounded through a bypass capacitor 18, and the source of the switch 19 is connected to the second endpoint 152 of the secondary winding 15 of the transformer 13.

The first endpoint 151 of secondary winding 15 of the transformer 13 is grounded.

Figure 2:
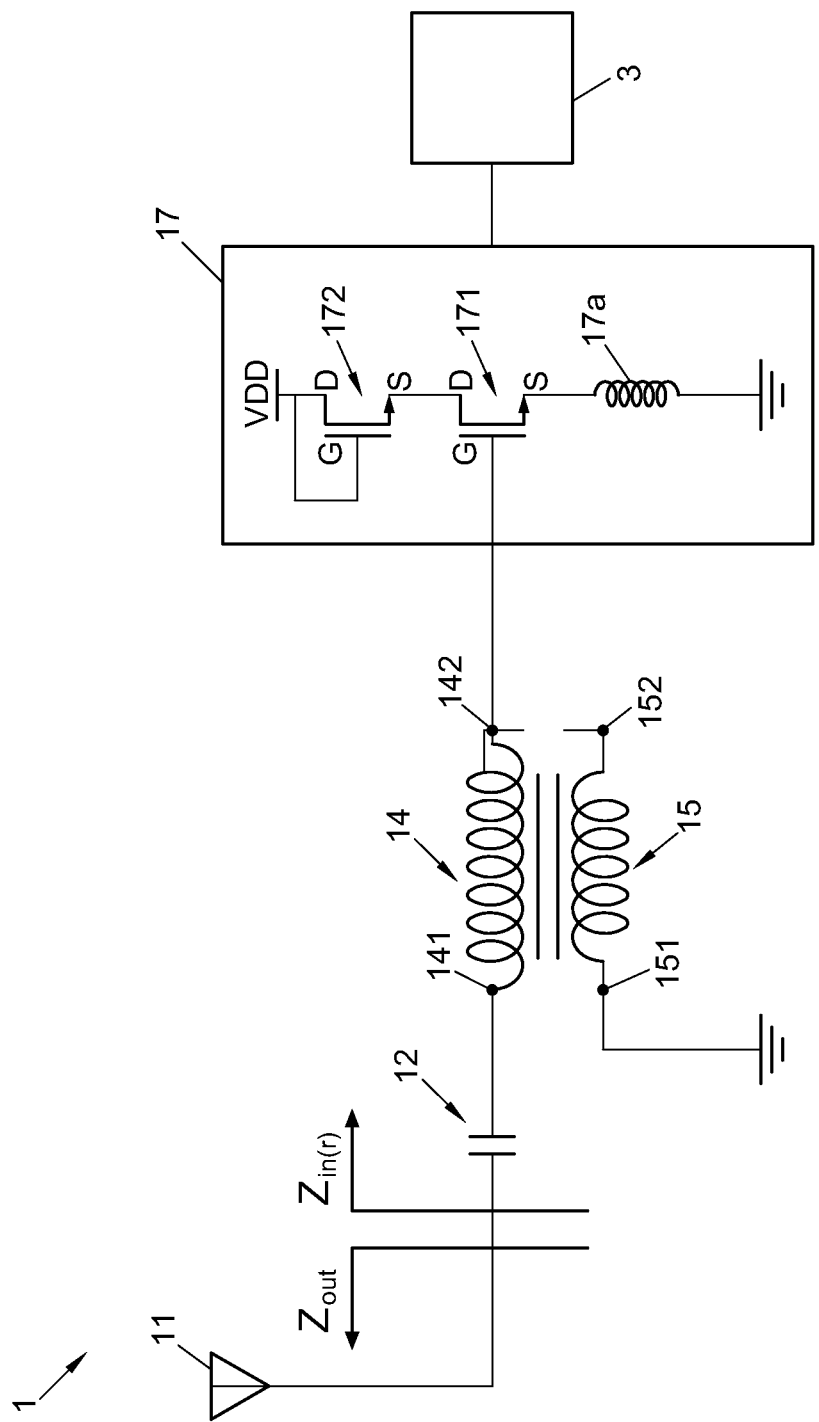
FIG. 2 is a schematic view of a radio communication transceiver 1 operating in a receiving state according to an example of the present invention.

FIG. 2 is a schematic view of the radio communication transceiver 1 operating in a receiving state according to the present invention. Referring to FIG. 2, the LNA 17 further comprises a first transistor 171, a second transistor 172, and an inductor 17a. A gate of the first transistor 171 is connected to the second endpoint 142 of the primary winding 14, and a source of the first transistor 171 is grounded through the inductor 17a. The second transistor 172 is cascoded with the first transistor 171. A source of the second transistor 172 is connected to a drain of the first transistor 171, and a gate and a drain of the second transistor 172 are connected to a power supply $V_{DD}$.

The radio communication transceiver 1 can be operated in a first state, such as a receiving state, and a second state, such as an emitting state. When the radio communication transceiver 1 intends to operate in the receiving state, the switch 19 receives a first potential of the CS from the host 2 and is turned off, so that the secondary winding 15 is floated. A signal received by the antenna 11 is transmitted to the internal circuit 3 through the coupling capacitor 12, the primary winding 14, and the LNA 17.

At this time, input impedance $Z_{in}(r)$ of the radio communication transceiver 1 is total impedance formed by the primary winding 14 and the LNA 17.

Hence, it is assumed that the radio communication transceiver 1 is operated at the input impedance in the receiving state, such that the following equation can be deduced:

$$Z_{in}^*(r) = s(L_1 + L_s) + \frac{1}{sC_{gs}} + \frac{g_m L_s}{C_{gs}}$$

in which the above equation is a conjugated complex; $C_{gs}$ is gate to source parasitic capacitance of the first transistor 171 of the LNA 17; $L_s$ is inductance of the inductor 17a of the LNA 17; $g_m$ is transconductance of the first transistor 171; and $$\frac{g_m L_s}{C_{gs}}$$

is a real part of $Z_{in}(r)$.

The foregoing parameters can be mated in the circuit according to actual situations to achieve impedance matching. In an embodiment of the present invention, the following data can be used for reference:

$$f = 2.4 \text{ GHz}$$
$$L_1 = 2.6 \text{ nH}$$
$$\frac{g_m L_s}{C_{gs}} = 50 \Omega$$

Figure 3:
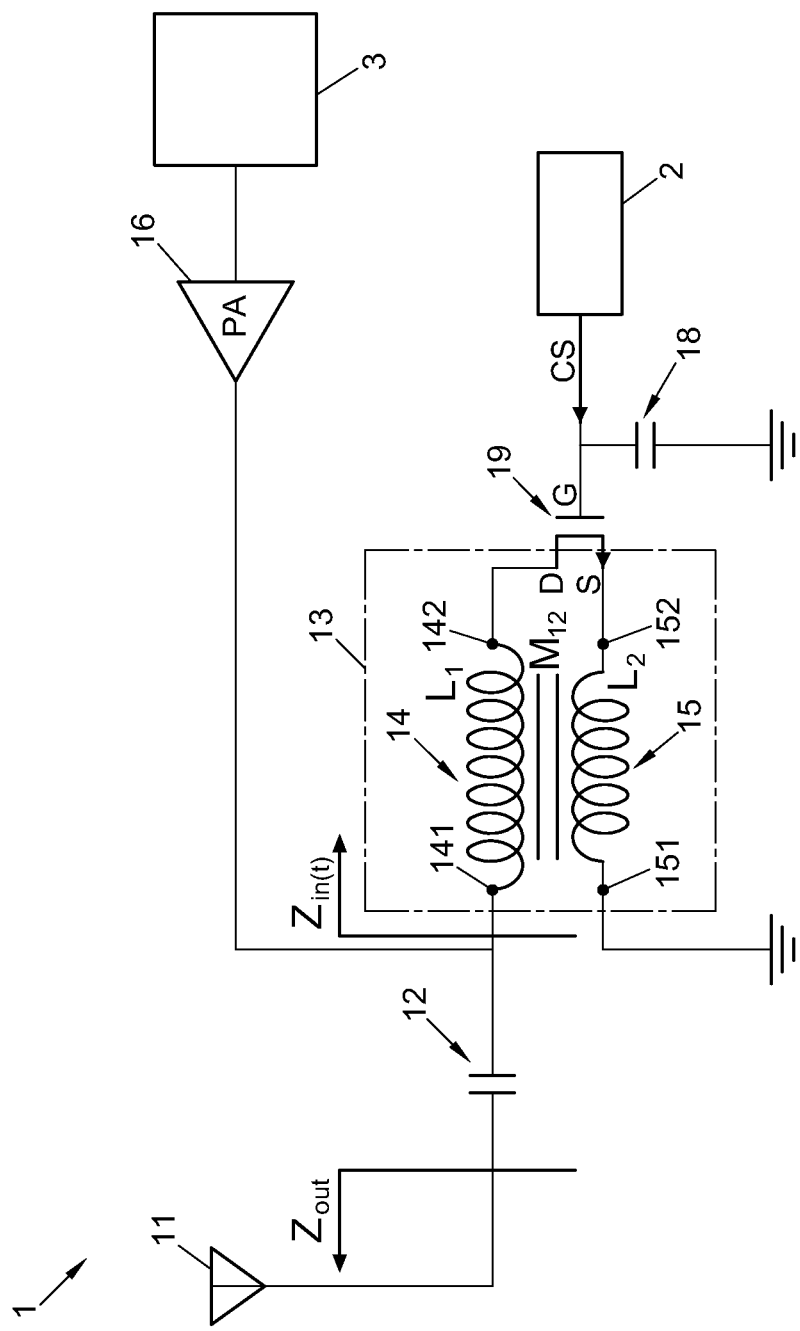
FIG. 3 is a schematic view of a radio communication transceiver 1 operating in an emitting state according to an example of the present invention.

FIG. 3 is a schematic view of the radio communication transceiver 1 operating in an emitting state according to the present invention. Referring to FIG. 3, when the radio communication transceiver 1 intends to operate in the emitting state, the switch 19 receives a second potential of the CS from the host 2 and is turned on, so that the second endpoint 142 of the primary winding 14 is electrically coupled to the second endpoint 152 of the secondary winding 15.

At this time, input impedance $Z_{in}(t)$ of the radio communication transceiver 1 is total impedance formed by the primary winding 14 and the secondary winding 15 of the transformer 13.

It is assumed that the radio communication transceiver 1 is operated at the input impedance in the emitting state, such that the following equation can be deduced:

$$Z_{in}(t) = s \times (L_1 + L_2 + M_{12}) + \frac{1}{s \times C_{par}}$$

$$s = jw$$

$$k = \frac{M_{12}}{L_1 \times L_2}$$

in which $L_1$ is inductance of the primary winding 14; $L_2$ is inductance of the secondary winding 15; $C_{par}$ is the parasitic capacitances; and $M_{12}$ is mutual inductance between the primary winding 14 and the secondary winding 15, and is a coupling coefficient of the primary winding 14 and the secondary winding 15, and is a coupling coefficient of the primary winding 14 and the secondary winding 15 according to a mutual inductance formula.

When the radio communication transceiver 1 operates in the emitting state, the primary winding 14 and the secondary winding 15 form a radio frequency choker (RFC), such that the signal of the PA 16 can be transferred to the antenna 11, thus avoiding the signal from entering the LNA 17 to cause damage device. Likewise, the foregoing parameters can be mated in the circuit according to actual situations to achieve impedance matching. In an embodiment of the present invention, the following data can be used for reference:

k=0.7;
$C_{par}$=200 fF

What is claimed is:

1. A radio communication transceiver, comprising:
    a transformer, having a primary winding and a secondary winding, wherein the primary winding has a first endpoint and a second endpoint, and the secondary winding has a first endpoint and a second endpoint;
    a switch, having a gate, a drain, and a source, wherein the gate receives a control signal (CS), the drain is connected to the second endpoint of the primary winding of the transformer, and the source is connected to the second endpoint of the secondary winding of the transformer;
    a power amplifier (PA), having an output terminal connected to the first endpoint of the primary winding of the transformer; and
    a low noise amplifier (LNA), having an input terminal connected to the second endpoint of the primary winding of the transformer;
    wherein the switch enables the radio communication transceiver to receive a signal through an antenna and transmit the signal to the LNA corresponding to a first potential of the CS, and enables the signal to be emitted by the antenna through the PA according to a second potential of the CS.

2. The radio communication transceiver according to claim 1, wherein the switch is turned off corresponding to the first potential of the CS, so that the secondary winding of the transformer is floating.

3. The radio communication transceiver according to claim 1, wherein the gate of the switch is grounded through a bypass capacitor.

4. The radio communication transceiver according to claim 1, wherein the LNA comprises an inductor, a first transistor, and a second transistor, a gate of the first transistor is connected to the second endpoint of the primary winding, a source of the first transistor is grounded through the inductor, and a source of the second transistor is connected to a drain of the first transistor.

5. The radio communication transceiver according to claim 4, wherein the first endpoint of the primary winding of the transformer is connected to the antenna through a coupling capacitor, and the first endpoint of the secondary winding is grounded.

6. The radio communication transceiver according to claim 5, wherein impedance of the antenna matches with total impedance formed by impedance of the primary winding of the transformer and impedance of the LNA according to the following equation:

$$Z_{out} = Z_{in}^*(r) = s(L_1 + L_s) + \frac{1}{sC_{gs}} + \frac{g_m L_s}{C_{gs}}$$

wherein $Z_{out}$ is the impedance of the antenna, $Z_{in(r)}$ is the total impedance formed by the primary winding and the LNA, * denotes a conjugated complex, $C_{gs}$ is gate to source parasitic capacitance of the first transistor in the LNA, $L_s$ is inductance of the inductor in the LNA, and g–jwrw–2πfifmg$_m$ g$_m$ is inductance of the first transistor in the LNA.

7. The radio communication transceiver according to claim 1, wherein an input terminal of the PA is connected to an up-conversion circuit module, and an output terminal of the LNA is connected to a down-conversion circuit module.

8. The radio communication transceiver according to claim 1, wherein the switch is turned on corresponding to the second potential of the CS, so that the second endpoint of the primary winding of the transformer is electrically coupled to the second endpoint of the secondary winding.

9. The radio communication transceiver according to claim 8, wherein the primary winding and the secondary winding of the transformer form a radio frequency choker (RFC).

10. The radio communication transceiver according to claim 9, wherein impedance of the antenna matches with total impedance formed by the primary winding and the secondary winding of the transformer according to the following equation:

$$Z_{in}(t) = s \times (L_1 + L_2 + M_{12}) + \frac{1}{s \times C_{par}}$$

$$s = jw$$

$$k = \frac{M_{12}}{L_1 \times L_2}$$

wherein $Z_{in}(t)$ is the total impedance formed by the primary winding and the secondary winding of the transformer, $L_1$ is inductance of the primary winding of the transformer, $L_2$ is inductance of the secondary winding of the transformer, and $M_{12}$ is mutual inductance between the primary winding and the secondary winding of the transformer, and is a coupling coefficient of the primary winding and the secondary winding of the transformer.

* * * * *